United States Patent [19]

Boutin et al.

[11] 4,308,148

[45] Dec. 29, 1981

[54] PREPARATION OF WATER SOLUBLE POLYMERIC FLOCCULANTS BY PHOTOPOLYMERIZATION OF HYDROPHILIC MONOMERS

[75] Inventors: Jean Boutin, Mions; Jean Neel, Lyons, both of France

[73] Assignee: Rhone-Poulenc Industries, Paris, France

[21] Appl. No.: 46,488

[22] Filed: Jun. 7, 1979

[30] Foreign Application Priority Data

Jun. 9, 1978 [FR] France ............................... 78 17858

[51] Int. Cl.$^3$ .............................................. C08F 2/54
[52] U.S. Cl. ................................. 210/705; 204/159.12; 204/159.23; 260/17 A; 260/17.4 ST; 526/200; 526/210
[58] Field of Search ....................... 204/159.23, 159.12; 260/17 A, 17.4 ST; 526/200, 210; 210/705

[56] References Cited

U.S. PATENT DOCUMENTS

| | | | |
|---|---|---|---|
| 3,635,857 | 1/1972 | Restaino et al. | 204/159.12 |
| 3,640,826 | 2/1972 | Lang et al. | 260/17 A |
| 3,872,063 | 3/1975 | Kim | 526/210 |
| 3,919,140 | 11/1975 | Hirata et al. | 260/17 A |
| 4,024,040 | 5/1977 | Phalangas et al. | 204/159.23 |
| 4,178,221 | 12/1979 | Boutin et al. | 204/159.23 |

*Primary Examiner*—Wilbert J. Briggs, Sr.
*Attorney, Agent, or Firm*—Burns, Doane, Swecker & Mathis

[57] ABSTRACT

Water soluble polymeric flocculants are prepared by photopolymerizing olefinically unsaturated hydrophilic monomer(s), the photopolymerization recipe including a polyhydroxylated organic additive, such as gluconic acid. Such polyhydroxy compound facilitates solubilization of the resultant flocculants, without substantial decrease in the molecular weight thereof, and ensures against the by-production of water insoluble fractions.

16 Claims, No Drawings

PREPARATION OF WATER SOLUBLE POLYMERIC FLOCCULANTS BY PHOTOPOLYMERIZATION OF HYDROPHILIC MONOMERS

BACKGROUND OF THE INVENTION

1. Field of the Invention

The present invention relates to the photopolymerization of hydrophilic monomers and to the water soluble polymers resulting therefrom, as well as to the use of such polymers as polymeric flocculants.

2. Description of the Prior Art

It is well known to this art to prepare polymeric flocculating agents via photopolymerization of acrylic monomers, specifically acrylamide, methacrylamide, acrylic or methacrylic acids, optionally the salts thereof, and quaternary ammonium salts derived from dialkylaminoalkyl (meth)acrylates.

A plurality of characteristics and properties is typically required of such organic polymeric flocculating agents and of the respective processes for the preparation thereof, certain of which are often contradictory and mutually inconsistent, i.e.,: the polymeric flocculating agents must be water soluble; they must have molecular weights as high as possible (high intrinsic viscosity); when dissolved in water, they must, if possible, leave no insoluble residue; their speed of dissolution in water must be as high as possible; it must be possible to produce such polymeric flocculants by polymerization of an aqueous monomer solution which is as highly concentrated as possible in order that the output of the production facility will be high, while, simultaneously, the heat generated during polymerization, or exotherm, must be quickly dissipated such that as low a temperature as possible is maintained in the polymerization recipe to prevent degradation of polymer, a reduction in molecular weight, and the possible formation of insoluble fractions in the water; and, finally, it is necessary that the polymerization quickly proceed to as advanced a stage as is possible, in order that the content of residual monomer or monomers in the flocculant be as low as possible. Further, if it is necessary to include photopolymerization additives, same should be, to the extent possible, both odorless and nontoxic. Finally, it is desirable that the pH of the solution subjected to photopolymerization not be too high, especially when the monomer or monomers utilized are susceptible to saponification.

It is moreover, quite difficult to attain and reconcile all of the foregoing objectives when the monomers are pure, it is even more difficult when the monomers contain impurities.

It of course is a known fact that acrylamide contains impurities, particularly that acrylamide resulting from the hydrolysis of acrylonitrile and especially the sulfuric acid hydrolysis thereof. These impurities, as of yet unknown in nature, normally are acidic in character and this permits the evaluation of the degree of impurity of the monomer by measuring its acid number. It is, however, not enough to simply neutralize the monomer and thus to neutralize the impurities to eliminate the deleterious effects thereof, because acid number is not an absolute value reflecting true purity of the acrylamide.

The acid number is determined by neutralization with N/10 potassium hydroxide [color change indicated by phenol red] of a solution containing 90 cm$^3$ pure water and 10 g acrylamide, and it is expressed in milligrams of KOH necessary to neutralize 1 g acrylamide.

An increase in the acid number of acrylamide [acrylamide originating from the sulfuric acid hydrolysis of acrylonitrile and without any special neutralization] is accompanied by enhancement of the deleterious effects attendant use of such monomer. These deleterious effects tend to manifest themselves initially by prolonging that amount of time required for dissolution of the resultant polymer in water, but may even give rise to the formation of insoluble gels. With an acid number of 0.4, appreciable deleterious effects are already observed; the time period required for dissolution of the flocculant in water may be multiplied by a factor of 5 or even 10 simply as a result of an increase in the acid number of but a few tenths of one.

The aforesaid deleterious effects manifest themselves not only for the abovementioned impurities of acrylamide, but also for all types of other impurities, of other monomers. Thus, acrylic acid often contains acrolein which gives rise to those deleterious effects when present in but very small amounts; its influence is observed even at 5 ppm [parts per million] of acrolein in the acrylic acid. In the monomers of the quaternary ammonium type, there are other harmful impurities; and all of the above have prompted various techniques for the purification of the subject monomers [see, for example, British Patent Specification No. 1,459,811].

SUMMARY OF THE INVENTION

Accordingly, a primary object of the present invention is the provision of an improved process for the preparation of water soluble organic polymers useful as polymeric flocculants.

Another object of the invention is to provide for the improved photopolymerization of hydrophilic monomers.

Yet another object of the invention is the provision of an improved process for the photopolymerization of acrylic monomers into high quality polymeric flocculating agents, even in the event that the starting monomers are not of high purity.

Still another object of this invention is to provide a process for the photopolymerization of aqueous solutions of acrylic monomers which need not be at an excessively high pH.

Yet another object of the invention is to provide an improved photopolymerization process yielding polymeric flocculating agents which are more rapidly soluble in water and which contain no water insoluble fractions.

Yet another object of the invention is the provision of an improved photopolymerization wherein solubilization of the resultant flocculating agents is facilitated by incorporating various additives into the polymerization recipe, without substantially decreasing the molecular weight of said resultant flocculating agents, even when varied and/or large amounts of such additives are included, and even when monomers of varying degrees of quality and purity are polymerized.

Briefly, the improved process according to the invention for the preparation of water soluble polymeric flocculating agents especially useful in the treatment of waste and other impure water features the continuous deposition, onto a moving endless belt or support, of a thin layer or film of an aqueous solution of olefinically unsaturated hydrophilic monomers, said solution comprising a photopolymerization promoter and a photopolymerization additive which is a polyhydroxy compound comprising at least two, and preferably at least three, secondary alcohol functions in its molecule, and then exposing said deposited thin layer to irradiation with light rays having a wave length between 150 and 500 mµ.

DETAILED DESCRIPTION OF THE INVENTION

Preferred photopolymerization additives of the aforementioned type are those which contain in the same hydroxylated molecule, one or two carboxyl groups [whether in acid or salt form, i.e., carboxylates] and, more preferably, especially those of the sugar family [or carbohydrates], specifically those comprising 5 or 6 carbons atoms; when the salts are employed, the alkali metal and $NH_4{}^+$ salts are preferred, and whereby the salification may be effected in situ, in the medium subjected to the photopolymerization. Representative of the more preferred additives are sorbitol, saccharic and gluconic acids and their sodium, potassium or ammonium salts, the carboxymethylcelluloses, and the diacid starches. The amount of the polyhydroxy additive incorporated according to the invention advantageously varies between 0.1 and 20% by weight, preferably between 0.5 and 10%, with respect to the total amount of monomer or monomers employed.

The wave length of the irradiation is preferably comprised between 300 and 450 mµ [ultraviolet radiation].

The beginning or starting material monomer solution preferently contains a photopolymerization promoter, and optionally, other photopolymerization aids and additives.

The reactant olefinically unsaturated monomers comprise at least 50% by weight, and preferably at least 80% by weight, of hydrophilic acrylic monomers.

Representative of those monomers especially adapted for photopolymerization according to the invention are: acrylamide, methacrylamide, acrylic acid, methacrylic acid, methallylsulfonic acid, and vinylbenzenesulfonic acid and the soluble salts or esters thereof, particularly the alkali metal or ammonium salts, N-vinylpyrrolidone, methyl-2-vinyl5-pyridine and the aminoalkyl acrylates and methacrylates; these latter compounds are preferably quaternized and preferably contain 4 to 16 carbon atoms in their respective aminoalkyl moieties. Photopolymerization of the aforesaid monomers, wherein individually or in any admixture thereof, results in homopolymeric or copolymeric flocculating agents, the nature and proportions of such monomers naturally being selected as to effect preparation of water soluble polymers; thus, acrylonitrile and methacrylonitrile may also be used as comonomers, but the content thereof is preferably limited with respect to the other monomers to less than 3% by weight.

The preferred monomers are acrylamide, acrylic acid and the alkali metal salts thereof, and the quaternized dialkylaminoalkyl methacrylates [in chloride or sulfate form].

The concentration of monomer(s) in the aqueous monomer solution subjected to photopolymerization per the invention is typically comprised between 30 and 90% by weight. For acrylamide and the various acrylates, the concentration is typically between 30 and 70%, preferably between 40 and 60% by weight. In the case of the quaternized ammonium salts, particularly those derived from aminoalkyl methacrylates, the concentration typically is between 40 and 90%, preferably between 70 and 88% by weight. In the case of acrylamide in combination with the quaternized aminoalkyl methacrylate salts, the concentration of same in the aqueous monomer solution is typically between 40 and 70% by weight, and preferably between 45 and 65% by weight.

The promoters of the photopolymerization, or photoinitiators, are themselves known. Specifically, the following are noted as representative: diacetyl, dibenzoyl, benzophenone, benzoin and its alkyl ethers, in particular its methyl, ethyl, propyl, isopropyl ethers. The photoinitiator content of the initial monomer solution exposed to photopolymerization is typically between 0.005 and 1% by weight of the monomer or monomers, preferably between 0.01 and 0.5% by weight. Anthraquinone polymerization additives may also be used, as described in French Pat. No. 2,327,258.

The mobile support upon which the aqueous monomer solution to be polymerized is deposited, advantageously comprises an endless conveyor belt, or, in certain embodiments, of several endless conveyor belts in series [the second conveyor belt is utilized only upon solidification of the photopolymerized medium]. The thickness of the aqueous solution subjected to photopolymerization is typically between 2 and 20 mm, preferably between 3 and 8 mm. The mobile support is preferably water repellent; suitable materials comprising the support include the polyperfluoroolefins [homo- or copolymers], and metals [either with or without a covering layer of a water repellent film, such as, for example, a polyester film].

In order to eliminate or dissipate the heat produced during photopolymerization, it is advantageous to cool the mobile photopolymerization support. Cooling is conveniently effected at the lower surface of the mobile support by means of spraying same with cold water. The temperature of the polymerization medium is maintained below approximately 70° C., preferably below 60° C. However, it is possible to dispense with the cooling, in particular after a high proportion of the monomers has already polymerized, for example, when the residual monomer content is less than 10%, preferably less than 2% [by weight with respect to the mass exposed to photopolymerization]. The pH of the aqueous monomer solutions exposed to photopolymerization typically is between 4 and 13. The specific value of the pH depends on various factors, specifically on the particular monomer used and the resultant molecular weights desired, and also on the impurities contained in the monomers. Generally, by raising the pH, cross-linking of the highest molecular weight fractions is prevented [cross-linking giving rise to insoluble fractions]. One of the advantages of the additives according to the invention is to permit the use of lower pH values than in the known processes [for monomers of a given nature and concentration, and when it is desired to obtain polymers with the highest molecular weights possible; such advantage is most notable in the photopolymerization of anionic monomers, i.e. those monomers bearing cation exchange groups, with the practical ph range therefor being lowered from 12-13 to 9-11.5].

Per all of the foregoing, the invention features exposing an aqueous solution of olefinically unsaturated hydrophilic monomers to photopolymerization under the aforenoted conditions. However, it should be understood and it is quite apparent that the photopolymerization medium is only initially in the state of an aqueous solution having the aforesaid character and concentrations; rather, as the photopolymerization progresses, the photopolymerization medium becomes increasingly viscous, until it becomes solid. The photopolymerization itself may be effected in one or several phases; the atmosphere surmounting [i.e. located above] the photopolymerization medium is initially and advantageously purged of oxygen; this may be conveniently effected by flushing the photopolymerization environment with an inert gas. However, it is also possible to carry out the photopolymerization in the presence of oxygen, in particular, if appropriate additives are incorporated into the solution to be polymerized, or when the unpolymerized monomer content in the photopolymerization medium becomes low, for example, less than 10%, preferably less than 5% [by weight with respect to the mass exposed to photopolymerization].

The ultraviolet irradiation may thus be continued until the photopolymerization has progressed to a stage whereat virtually all monomer has been converted. According to one preferred embodiment, the irradiation may be conducted in several phases. Thus, in a first phase [1 to 20 minutes, preferably 3 to 7 minutes], the irradiation is carried out with ultraviolet rays having wave lengths between 300 and 450 m$\mu$, with the average energy of active radiation being between 300 and 450 watt/m$^2$ and the oxygen content of the atmosphere [surmounting the photopolymerization medium] being less than 5% by volume, preferably less than 0.5%, and such is followed by a second phase [1 to 20 minutes, preferably 3 to 10 minutes] of irradiation with ultraviolet rays having wave lengths again between 300 450 m$\mu$, the average energy of active radiation being between 300 and 2000 watt/m$^2$ and the oxygen content also being less than 5%, preferably less than 0.5%.

In certain instances, the two phases may be supplemented by yet a third phase [usually from 20 minutes to 3 hours, preferably 25 minutes to 90 minutes] of irradiation of the nonliquid [mostly rubbery] layer obtained, with the irradiation taking place in air, without cooling of the support [while the first two phases are effected with cooling of the support], the average energy of the radiation being between 20 and 500 watt/m$^2$.

In such a three-stage process according to the invention, it is preferred to humidify the atmosphere in all of the stages, regardless of whether the atmosphere is with or without oxygen, or whether the process takes place in air.

In order to further illustrate the present invention and the advantages thereof, the following specific examples are given, it being understood that same are intended only as illustrative and in nowise limitative.

EXAMPLE 1

Into suitable dissolution vessel, a solution was prepared by successively adding, under agitation, the following:
[i] 65.25 kg deionized water;
[ii] 47.5 kg acrylamide having an acid number equal to 0.6 [originating from the sulfuric acid hydrolysis of acrylonitrile];
[iii] 19.5 kg of a 50% by weight aqueous solution of sodium hydroxide; and
[iv] 0.45 kg sodium gluconate.
[v] 17.55 kg acrylic acid.

The aforesaid solution was fed to the head of a packed column; into the same column, also at its head, there was then introduced a dilute 30% solution of sodium hydroxide to adjust the pH to 10.5. There were also commenced, at the center of the column, a 137 cm$^3$/h flow of 34 g/l benzoin isopropyl ether in acrylic acid, and, at the base of the column, a flow of nitrogen sufficient to maintain the content of dissolved oxygen in the liquid issuing from the base of the column at less than or equal to 0.15 mg oxygen per liter of solution.

The deaerated aqueous solution of the monomer was next caused to flow continuously, at a rate of 31 l/h, onto a 45 cm wide continuous stainless steel belt, provided with two like lateral edge flanges to prevent lateral flow of the deposited liquid. The belt, additionally, was slightly inclined in the direction of flow to avoid backflow of the solution. The gaseous environment above the belt was confined by means of glass plate members and same was purged of oxygen via a flow of moist nitrogen. The metal belt was moving at a velocity of approximately 24 cm per minute. At this velocity, the thickness of the deposited layer of monomer solution was approximately 4.5 mm. The belt, which was cooled at its underside with 15° C. water, was exposed, over a length of 3.6 m, to a first irradiation phase constructed as follows: over a section having a length of 165 cm, 23 low pressure mercury vapor lamps were disposed perpendicular to the direction of motion of the belt and 10 cm above same; each the mercury lamps had an electric power of 40 watts [Philips Tlak 40 2/05] corresponding to an average power in ultraviolet radiation of approximately 80 watt/m$^2$, providing for the different rates in dissipation thereof. Such arrangement was succeeded by a second downstream irradiation phase, over the remaining 195 cm., which consisted of an array of four high pressure mercury vapor lamps having an electric power of 2000 watts each [Philips HTQ 7]. The four lamps were disposed in the direction of motion of the band, and emitted ultraviolet radiation of approximately 400 watts/m$^2$. The duration of the two phases of irradiation was approximately 15 minutes.

The following conditions/results were in evidence:

TABLE 1

| Length Exposed to Irradiation | Surface Temperature | Nature of Product |
| --- | --- | --- |
| 30 cm | 28° C. | Ropy product |
| 60 cm | 42° C. | Viscous product |
| 90 cm | 47° C. | Plastic product |
| 120 cm | 45° C. | Plastic product |
| 150 cm | 32° C. | Plastic product |

The expression "ropy product" connotes that the solution has acquired a viscosity sufficient so that it flowed but slowly, in the manner of oil, without being divided into droplets. A viscous product is characterized in that it is capable of flow, but that no air bubbles form therein when same is agitated violently by hand. A plastic product is a gel having a rubbery consistency: After 15 minutes of irradiation, a plastic film was obtained which was detached from the belt by simple stripping. A third irradiation phase was then effected in air for 1 hour by exposing the film obtained to a radiation treatment identical to and of the same intensity as that employed for the first 165 cm of the stainless steel belt.

Subsequently, the film was fragmented by means of a cutter, dried for 30 minutes at approximately 85° C., and then ground into powder.

The resultant powder was next completely dissolved in water at ambient temperature, over 16 hours, resulting in a concentration of 5 g/l of the polymer, having an intrinsic viscosity of 19 dl/g.

EXAMPLE 2

Example 1 was repeated, but acrylamide utilized had an acid number of 0.04 [instead of 0.6].

After grinding, the resultant powder could be completely dissolved in water in 2 hours [concentration 5 g/l], forming a solution having an intrinsic viscosity of 19 dl/g.

EXAMPLE 3

Into suitable dissolution vessel, a solution was prepared from the following ingredients:
 [i] 78 kg deionized water;
 [ii] 72 kg acrylamide having an acid number equal to 0.6 [acrylamide originating from the sulfuric acid hydrolysis of acrylonitrile];
 [iii] 1.8 kg sodium gluconate.

Photopolymerization was carried out as in Example 1, except that the benzoin isopropyl ether was introduced at a flow rate of 91 cm$^3$/h [instead of 137] and that the pH was adjusted to 10 [instead of 10.5].

After grinding, a powder was obtained which dissolved completely in water in 24 hours [concentration 5 g/l] and the resulting solution had an intrinsic viscosity of 15 dl/g.

EXAMPLE 4

Example 3 was repeated, but with the following modifications:
 [a] the acrylamide had an acid number of 0.04 [instead of 0.6];
 [b] only 1.1 kg of gluconate was used [instead of 1.8 kg];
 [c] the flow rate of the benzoin isopropyl ether solution was 135 cm$^3$/h [instead of 91]; and
 [d] the pH was adjusted to 9 [instead of 10].

After grinding, a powder was obtained which dissolved completely in water in 4 hours [concentration 5 g/l], and the resulting solution had an intrinsic viscosity of 15 dl/g.

EXAMPLE 5

Into suitable dissolution vessel, a solution comprising the following ingredients was prepared:
 [i] 65.25 kg deionized water;
 [ii] 47.5 kg acrylamide [acid number: 0.2; the acrylamide originated from the sulfuric acid hydrolysis of acrylonitrile];
 [iii] 17.55 kg impure acrylic acid [244 ppm hydroquinone monomethyl ether, 3% dimer, 25 ppm acrolein, 9.2 ppm furfural, 15 ppm acetaldehyde, 0.1% formic acid, 0.6% acetic acid, 0.5% propionic acid, sulfur compounds in an amount, expressed as sulfur, of 2.2 ppm];
 [iv] 19.5 kg of a 50% aqueous hydroxide solution; and
 [v] 0.45 kg sodium gluconate.

The photopolymerization process described in Example 1 was employed.

A powder which completely dissolved in water [concentration 5 g/l] in 48 hours and which had an intrinsic viscosity of 18.5 dl/g. was obtained.

EXAMPLE 6

Into suitable dissolution vessel, a solution was prepared from the following ingredients:
 [i] 65.7 kg deionized water;
 [ii] 72.5 kg acrylamide having an acid number equal to 0.2;
 [iii] 9.9 kg commercial ethyltrimethylammonium methacrylate chloride [concentration of the pure product: 85%, the complement of 100% consisting essentially of water; this commercial product was purified prior to use by the process described in British Patent Specification No. 1,459,811]; and
 [iv] 1.9 kg sodium gluconate.

The photopolymerization was effected by the process described in Example 1, but with the following modifications:
 [a] the benzoin ispropyl ether was dissolved in 34 g/l methanol and such solution was introduced into the mixture to be polymerized at the rate of 103 cm$^3$/h;
 [b] the pH was controlled at 8 by means of an ammoniacal solution of 10% by weight of $NH_4OH$; and
 [c] after 15 mn of polymerization as in Example 1, the resultant film was fragmented, dried for 45 minutes at 75° C., and ground.

The powder obtained completely dissolved in 1 hour, 45 minutes, in water, at a ambient temperature [concentration: 5 g/l]. The intrinsic viscosity of the polymer was approximately 10 dl/g, its residual monomer content was 0.15%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the photopolymerization of aqueous solutions of olefinically unsaturated hydrophilic monomers into water soluble polymeric flocculants, by exposing such monomers to photopolymerizing irradiation in the presence of a photopolymerization promoter, the improvement which comprises effecting said photopolymerization with irradiation of a wavelength between about 150 and about 500 mμ, in the conjoint presence of a solubilization facilitating amount of an organic polyhydroxy compound of the sugar family comprising at least two secondary alcohol functional groups, from 5 to 6 carbon atoms and one or two carboxyl groups or the salt forms thereof, and with the pH of the aqueous monomer solution ranging from 4 to 13.

2. The process as defined by claim 1, said polyhydroxy compound being present in an amount of from 0.1 to 20% by weight, based upon the total weight of the monomers.

3. The process as defined by claim 2, said polyhydroxy compound being present in an amount of from 0.5 to 10% by weight, based upon the total weight of the monomers.

4. The process as defined by claim 1, the concentration of monomers in the aqueous solutions thereof being between 30 and 90% by weight, and said monomers being selected from the group consisting of acrylamide, methacrylamide, acrylic acid, methacrylic acid, methallylsulfonic acid, vinylbenzenesulfonic acid, the salts and hydrophilic esters thereof, N-vinylpyrrolidone, methyl-2-vinyl-5-pyridine, aminoalkyl acrylate, aminoalkyl methacrylate, and quaternary aminoalkyl acrylate and methacrylate.

5. The process as defined by claim 4, said monomers being selected from the group consisting of acrylamide, acrylic acid, alkalic metal salts thereof, and the quaternized dialkylamino methacrylates having from 4 to 16 carbons in the respective aminoalkyl moieties thereof.

6. The process as defined by claims 1, or 4, said photopolymerization being effected by depositing a thin layer of the aqueous monomer solution on a traveling support, and thence exposing such thin layer to the photopolymerizing irradiation.

7. The process as defined by claim 6, said thin layer having a thckness of from 2 to 20 mm, and the concentration of photopolymerization promoter therein ranging from 0.005 to 1% by weight, based upon the total weight of the monomers.

8. The process as defined by claim 7, said thickness being from 3 to 8 mm, and said concentration of promoter ranging from 0.01 to 0.5% by weight.

9. The process as defined by claim 7, the traveling support being cooled during photopolymerization.

10. The process as defined by claim 9, the photopolymerization being effected in two stages, a first stage under irradiation having a wavelength of from 300 to 450 m$\mu$, having an average power of active irradiation of from 20 to 300 watt/m$^2$, and being from 1 to 20 minutes in duration, and a second stage under irradiation having a wavelength of from 300 to 450 m$\mu$, and having an average power of active irradiation of from 300 to 2000 watt/m$^2$.

11. The process as defined by claim 10, the oxygen content of the atmosphere surrounding the photopolymerization medium being less than 0.5%, and further comprising a third photopolymerization stage conducted in air, in the absence of cooling of the traveling support, and having an average power of active irradiation of from 20 to 500 watt/m$^2$ for at least 20 minutes.

12. A completely water soluble polymeric flocculant, prepared by the process as defined by claims 1, 6, 9 or 10.

13. In a process for the flocculation of waste and other impure waters, the improvement which comprises utilizing, as the flocculating agent therefor, the water soluble polymeric flocculant as defined by claim 12.

14. The process as defined by claim 1 wherein said polyhydroxy compound is selected from the group consisting of gluconic acid and saccharic acid and the salt forms thereof.

15. The process as defined by claim 1 wherein the oxygen content of the atmosphere surrounding the aqueous monomer solution to be photopolymerized is less than about 5% by volume.

16. The process as defined by claim 14 wherein the salt forms are the alkali metal or ammonium salts.

* * * * *